United States Patent Office 2,933,491
Patented Apr. 19, 1960

2,933,491

NITRO-SUBSTITUTED LACTAMS

Karl Klager, Monrovia, Calif., assignor to Aerojet-General Corporation, Azusa, Calif., a corporation of Ohio No Drawing. Application July 11, 1955
Serial No. 521,371

17 Claims. (Cl. 260—239.3)

This invention relates to new compositions of matter and a method for their preparation. In particular, this invention relates to nitro-substituted lactams having the general formula:

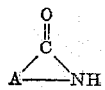

wherein A is a nitroalkylene radical.

These compounds are excellent plasticizers for nitropolymers, such as the polyurethane propellants disclosed in assignee's copending application Serial No. 422,649, filed April 12, 1954, now abandoned, as well as nitrocellulose. The polyurethane propellants are solid, smokeless, self-sustaining rocket propellants. In use they are enclosed in a conventional rocket chamber having an opening or exit nozzle at one end. The propellant can be ignited by means of a conventional igniter such as an electric squib-black powder igniter whereby combustion of the propellant grain is initiated. The gases produced by this combustion are expelled through the exit nozzle thereby imparting propulsive force to the rocket motor. Commercial plasticizers used at the present time are nonexplosive and hence detract from the explosive or propellant power of the nitropolymers into which they are incorporated. The compounds of this invention, however, are not only plasticizers but also exhibit high explosive energy.

The nitropolymers can be polymerized in the presence of the lactam or if desired the lactam can be mixed into the nitropolymer after polymerization. The plasticizer is incorporated into the nitropolymer in amounts preferably from about 10% to about 40% by weight of the composition.

In addition, the lactams of this invention readily undergo heat polymerization to produce polymers useful as ballistic modifiers for explosives and combustible plastics. The polymers can be mixed with conventional explosives such as PETN in any desired proportion depending upon the oxygen balance desired. In addition, the polymerized lactams of this invention are useful in the manufacture of shaped articles such as are commonly produced from thermosetting plastics.

The compounds of this invention are prepared by reacting a strong mineral acid salt of an ester of an amino acid with a moderately strong base, in accordance with the general reaction scheme set forth below:

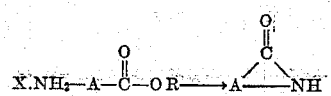

wherein R is an alkyl radical, A is a nitroalkylene radical having at least three carbon atoms and X is a strong mineral acid.

The amine salts used as starting materials in the practice of this invention are prepared by esterifying their corresponding amino acids in the presence of a mineral acid. The amino acids are obtained by hydrolysis of the corresponding nitro-aza-acid halides, in accordance with the method disclosed in my copending application Serial No. 426,902, filed April 30, 1954, now abandoned.

To more clearly illustrate my invention, the following examples are presented. It should be understood, however, that these examples are presented merely as a means of illustration and are not intended to limit the scope of the invention in any way.

EXAMPLE I

Preparation of 5,5-dinitrohexanolactam

A flask provided with a stirrer and thermometer was charged with 100 gm. methyl 6-amino-4,4-dinitrohexanoate hydrochloride, 500 ml. water, and 1500 ml. ether. From a dropping funnel 230 ml. of a 10% aqueous sodium carbonate solution was added gradually while stirring vigorously. After neutralization of all hydrochloric acid to a pH of 8, the ether solution was separated, dried over sodium sulfate, and concentrated. A colorless oil was obtained, which did not crystallize. However, after standing overnight the oil was converted into white crystals. These crystals were triturated with methanol and crystallized from ethanol. The yield was 48 gm. and the M.P. was 184–185° C. The elemental analysis of the product is as follows:

Calculated for $C_6H_9N_3O_5$: percent C, 35.47; percent H, 4.47; percent N, 20.68; percent $OCH_3$, 0. Found: percent C, 35.58; percent H, 4.71; percent N, 22.17; percent $OCH_3$, 0.

A wide variety of nitro-substituted lactams can be prepared in accordance with the method described in Example I. For example, 3,3-dinitrobutyrolactam is prepared from the acid salt of 4-amino-2,2-dinitrobutanoic acid; 4,4-dinitrobutyrolactam is prepared from the acid salt of 4-amino-3,3-dinitrobutanoic acid; 3,3-dinitropentanolactam is prepared from the acid salt of 5-amino-2,2-dinitropentanoic acid; 4,4-dinitropentanolactam is prepared from the acid salt of 5-amino-3,3-dinitropentanoic acid; 3,3-dinitropentanolactam is prepared from the acid salt of 5-amino-2,2-dinitropentanoic acid; 5,5-dinitrohexanolactam is prepared from the acid salt of 6-amino-4,4-dinitrohexanoic acid; 3,3-dinitrohexanolactam is prepared from the acid salt of 6-amino-2,2-dinitrohexanoic acid; 4,4-dinitrohexanolactam is prepared from the acid salt of 6-amino-3,3-dinitrohexanoic acid; 3,3,5,5-tetranitropentanolactam is prepared from the acid salt of 5-amino-2,2,4,4-tetranitropentanoic acid; 5,5-dinitrodecanolactam is prepared from the acid salt of 9-amino-4,4-dinitrononanoic acid; and 4,4-dinitrononalactam is prepared from the acid salt of 8-amino-3,3-dinitrooctanoic acid, by proceeding in accordance with the examples and discussion set forth above. Other members of this new class of lactams can be prepared in a like manner.

Any hydroxide or carbonate of an alkali or alkaline earth metal can be used to neutralize the mineral acid amine salt, however, sodium carbonate is preferred for reasons of cost, availability and its high solubility. Hydrochloric acid salts are preferred as a matter of convenience and availability.

This application is a continuation-in-part of my copending application Serial No. 426,903, filed April 30, 1954, now abandoned.

I claim:

1. As new compositions of matter, the nitro-substituted lactams having the general formula

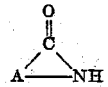

wherein A is a nitroalkylene radical having at least three carbon atoms.

2. As new compositions of matter, the nitro-substituted lactams having the general formula

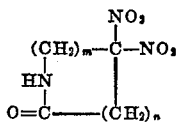

wherein m and n are small whole numbers from 0 to 4 inclusive, provided that the sum of m plus n is greater than 1.

3. As a new composition of matter, 5,5-dinitrohexanolactam having the structural formula

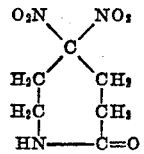

4. As a new composition of matter, 3,3-dinitrobutyrolactam having the structural formula

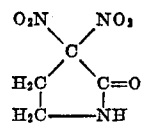

5. As a new composition of matter, 5,5-dinitrononalactam having the structural formula

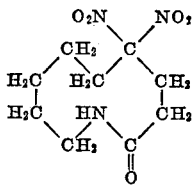

6. As a new composition of matter, 4,4-dinitrobutyrolactam having the structural formula

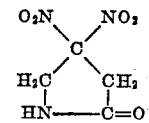

7. As a new composition of matter, 5,5-dinitropentanolactam having the structural formula

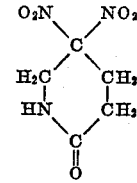

8. As a new composition of matter, 4,4-dinitropentanolactam having the structural formula

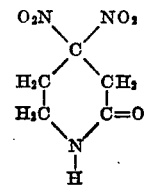

9. As a new composition of matter, 3,3-dinitropentanolactam having the structural formula

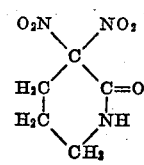

10. As a new composition of matter, 6,6-dinitrohexanolactam having the structural formula

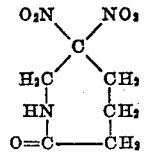

11. As a new composition of matter, 4,4-dinitrohexanolactam having the structural formula

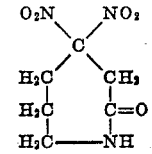

12. As a new composition of matter, 3,3-dinitrohexanolactam having the structural formula

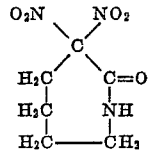

13. As a new composition of matter, 3,3,5,5-tetranitropentanolactam having the structural formula

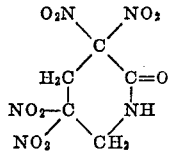

14. The method of preparing nitro-lactams having the general formula:

which comprises reacting a mineral acid salt of an amino acid having the general formula:

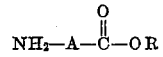

with a moderately strong base, selected from the group consisting of alkali and alkaline earth metal carbonates and hydroxides, wherein A is a nitroalkylene radical having at least three carbon atoms and R is an alkyl radical.

15. The method of preparing nitro-lactams having the general formula:

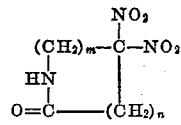

which comprises reacting a moderately strong base with a mineral acid salt of an amino acid ester having the general formula:

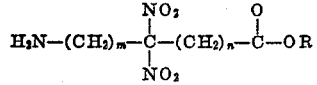

wherein R is an alkyl radical and m and n are whole numbers from 0 to 4 inclusive, provided the sum of m plus n is greater than 1.

16. The method of claim 15 wherein said base is selected from the group consisting of alkali and alkaline earth metal carbonates and hydroxides.

17. The method of preparing 5,5-dinitrohexanolactam which comprises reacting sodium carbonate and methyl 6-amino-4,4-dinitrohexanoate hydrochloride.

No references cited.